United States Patent [19]

McNamara, Jr. et al.

[11] Patent Number: 5,155,810
[45] Date of Patent: Oct. 13, 1992

[54] DUAL FIFO PERIPHERAL WITH COMBINATORIAL LOGIC CIRCUITRY

[75] Inventors: John L. McNamara, Jr., Tewksbury; Donald J. Rathbun, Methuen, both of Mass.

[73] Assignee: Bull HN Information Systems Inc., Billerica, Mass.

[21] Appl. No.: 295,683

[22] Filed: Jan. 10, 1989

[51] Int. Cl.⁵ .............................................. G06F 1/00
[52] U.S. Cl. .............................. 395/250; 364/DIG. 1
[58] Field of Search ... 364/200 MS File, 900 MS File; 395/250, 400, 425

[56] References Cited

U.S. PATENT DOCUMENTS

| | | | |
|---|---|---|---|
| 4,065,862 | 1/1978 | Meyer | 364/200 |
| 4,261,035 | 4/1981 | Raymond | 364/200 |
| 4,285,038 | 8/1981 | Sazuki et al. | 364/200 |
| 4,368,512 | 1/1983 | Kyu et al. | 364/200 |
| 4,404,628 | 9/1983 | Angelo | 364/200 |
| 4,466,062 | 8/1984 | Krikor | 364/200 |
| 4,516,201 | 5/1985 | Warren et al. | 364/200 |
| 4,602,331 | 7/1986 | Sheth | 364/200 |
| 4,674,033 | 6/1987 | Miller | 364/200 |
| 4,744,023 | 5/1988 | Welsch | 364/200 |
| 4,748,588 | 5/1988 | Norman et al. | 364/900 |
| 4,783,705 | 11/1988 | Moon et al. | 360/77 |
| 4,814,980 | 3/1989 | Peterson et al. | 364/200 |
| 4,823,312 | 4/1989 | Michael et al. | 364/900 |
| 4,890,254 | 12/1989 | Cooley | 364/900 |
| 4,914,570 | 4/1990 | Peacock | 364/200 |
| 4,942,553 | 7/1990 | Dalrymple et al. | 364/900 |
| 4,951,193 | 8/1990 | Muramatsu et al. | 364/200 |

*Primary Examiner*—Stuart S. Levy
*Assistant Examiner*—Rebecca L. Rudolph
*Attorney, Agent, or Firm*—James M. Smith; Faith F. Driscoll; John S. Solakian

[57] ABSTRACT

An adapter is connected between a peripheral controller and an intelligent peripheral device. The adapter allows the peripheral device to communicate with the controller. The adapter has control logic rather than a microprocessor for transmitting and receiving data. The control logic is comprised of combinatorial logic circuitry and a command register. The command register allows the controller to configure the cominatorial logic circuitry in order to control adapter operation.

21 Claims, 4 Drawing Sheets

DUAL FIFO PERIPHERAL WITH COMBINATORIAL LOGIC CIRCUITRY

BACKGROUND OF THE INVENTION

1. Field of Use

The present invention relates to data processing systems. More specifically, it relates to adapters for allowing communications between a peripheral controller and a peripheral device.

2. Prior Art

In recent years, peripheral controllers have been used to simultaneously control communication to and from a plurality of peripherals. Each of the controlled peripherals may have operating characteristics that differ greatly from its fellow peripherals. Instead of placing the burden on the controller to keep track of all the different operating characteristics, one solution has been to provide the controller with a standard protocol and to provide each peripheral device with an adapter which converts each peripheral device's communications into the standard protocol. Such adapters have also been used to resolve the need for the varying buffering requirements of different types of peripherals. A typical example of an adapter being used with a standardized controller is shown in pending U.S. patent application Ser. No. 057,553, filed June 3, 1987 by Lewis et al, now abandoned.

Especially troublesome has been the problem of how to design an adapter that is connected to an intelligent device, for the protocol tends to be more sophisticated with intelligent devices than with nonintelligent devices. One solution has been to include a microprocessor in the adapter that controls data transfers. However, these microprocessors increase adapter cost and size.

SUMMARY OF THE INVENTION

Included in the present invention is an adapter connected between a peripheral controller and a peripheral device. The adapter has two FIFO buffers coupled to the peripheral device and controller: a receiving FIFO buffer and a transmitting FIFO buffer. The receiving FIFO buffer stores data from a peripheral device that is to be transferred to the controller. The transmitting FIFO buffer, on the other hand, stores data that is to be transferred from the controller to the peripheral device. Also included in the adapter is a peripheral device interface that is connected between the FIFO buffers and the peripheral device. It transfers data between the peripheral device and the FIFO buffers.

Adapter operation is controlled by control logic circuitry that is coupled to the FIFO buffers and the peripheral device interface. The control logic circuitry is comprised of combinatorial logic gates. It controls the FIFO buffers, the peripheral device interface, and data paths between the FIFO buffers and the peripheral device interface. The control logic circuitry controls the FIFO buffers so that they operate in two modes: a receiving mode and a transmitting mode. When in a receiving mode, the receiving FIFO buffer can have data written into it or read from it, and when in transmitting mode, the transmitting FIFO buffer can have data written into it or read from it. The switching of modes from transmitting mode to receiving mode is performed automatically by the control logic circuitry in response to the transmitting FIFO being empty.

BRIEF DESCRIPTION OF THE DRAWINGS

The foregoing and other objects, features and advantages of the invention will be apparent from the following more particular description of a preferred embodiment of the invention, as illustrated in the accompanying drawings.

DETAILED DESCRIPTION OF THE PREFERRED EMBODIMENT

Figure 1:
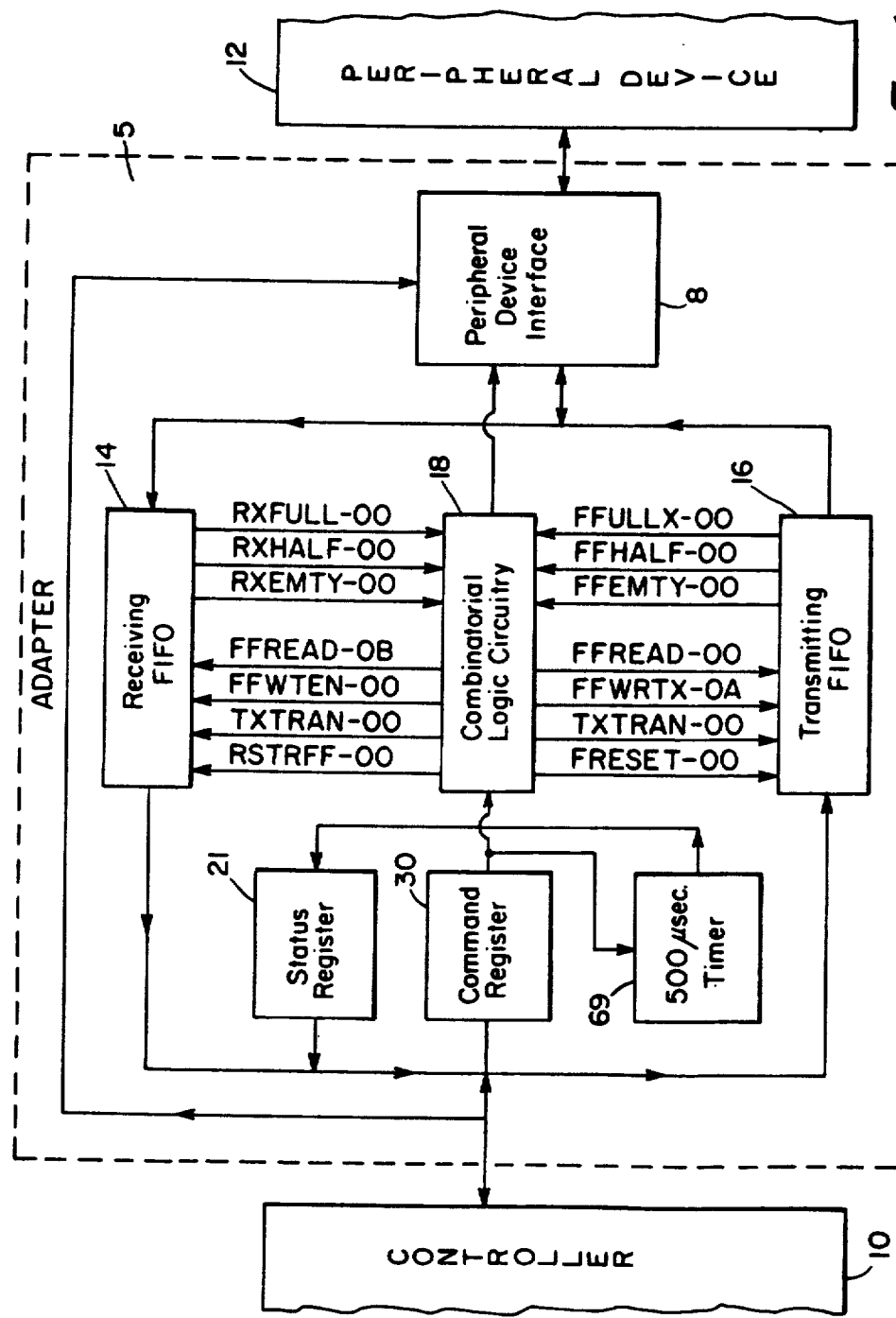
FIG. 1 shows the major components of the adapter.

In the preferred embodiment of the invention, an adapter 5 is connected between a peripheral controller 10 and a peripheral device 12 (FIG. 1). The adapter 5 has been designed with an intelligent printer in mind, but the adapter may be used with many other types of peripheral devices. The adapter has two First-In-First-Out (FIFO) buffers 14 and 16 for storing data as it flows through the adapter. One FIFO buffer is the transmitting FIFO buffer 16 which receives data from the controller 10 that is to be transferred to the peripheral device 12. The other FIFO buffer is the receiving FIFO buffer 14. It receives data from the peripheral device 12 that is to be transferred to the controller 10. In the preferred embodiment each FIFO buffer is an Integrated Device Technology, Inc. IDT7201S/L.

Figure 3:
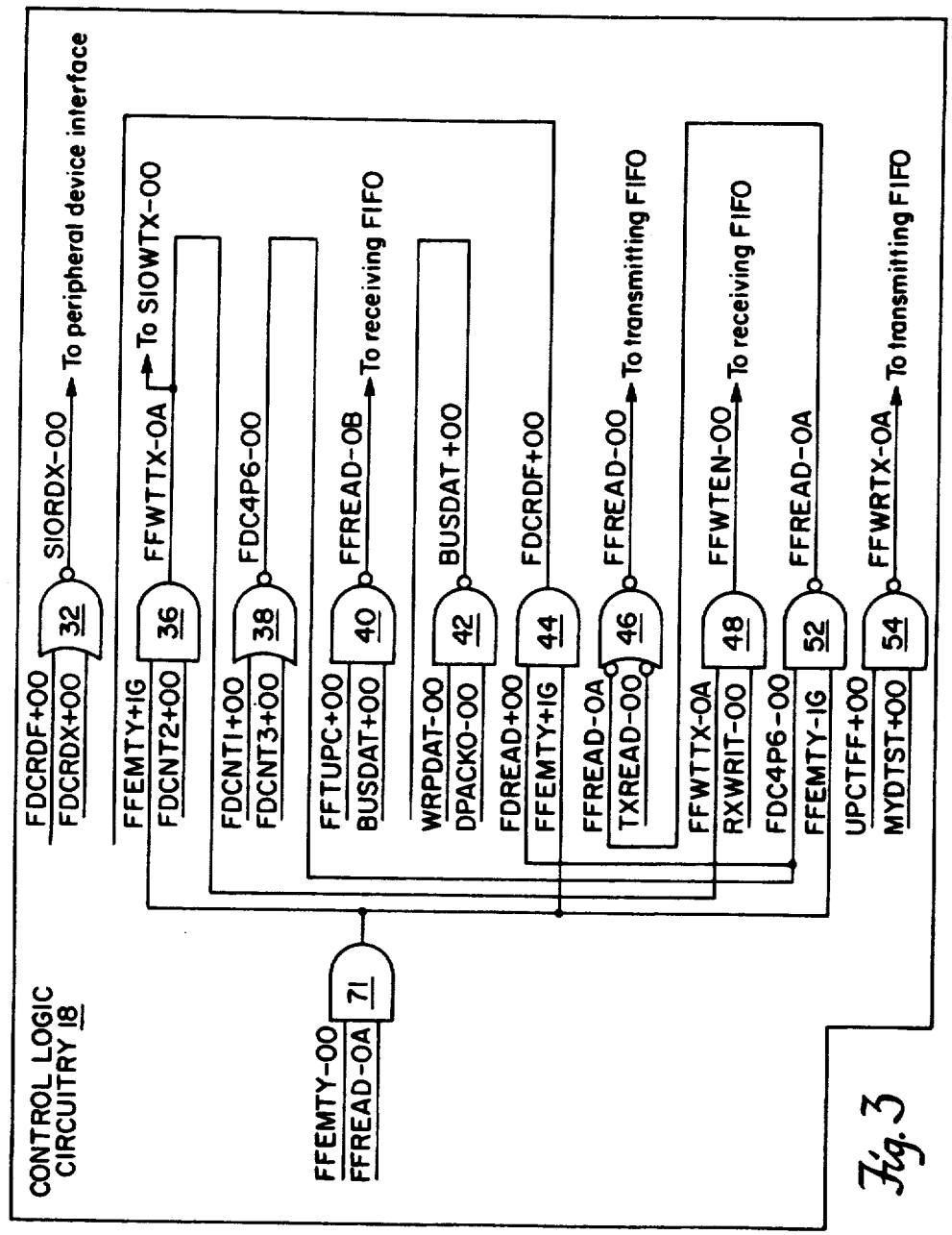
FIG. 3 shows the control logic circuitry in more detail.

The receiving FIFO buffer 14, transmitting FIFO buffer 16, and peripheral device interface 8 are all controlled by the control logic circuitry. The control logic circuitry partially relies on commands held in the command register 30 for direction. These commands are placed in the command register 30 by the controller 10. The commands select inputs for the combinatorial logic circuitry 18. The command register 30 and combinatorial logic circuitry 18, together comprise the control logic circuitry. The details of the control combinatorial logic circuitry 18 are shown in FIG. 3.

Figure 2:
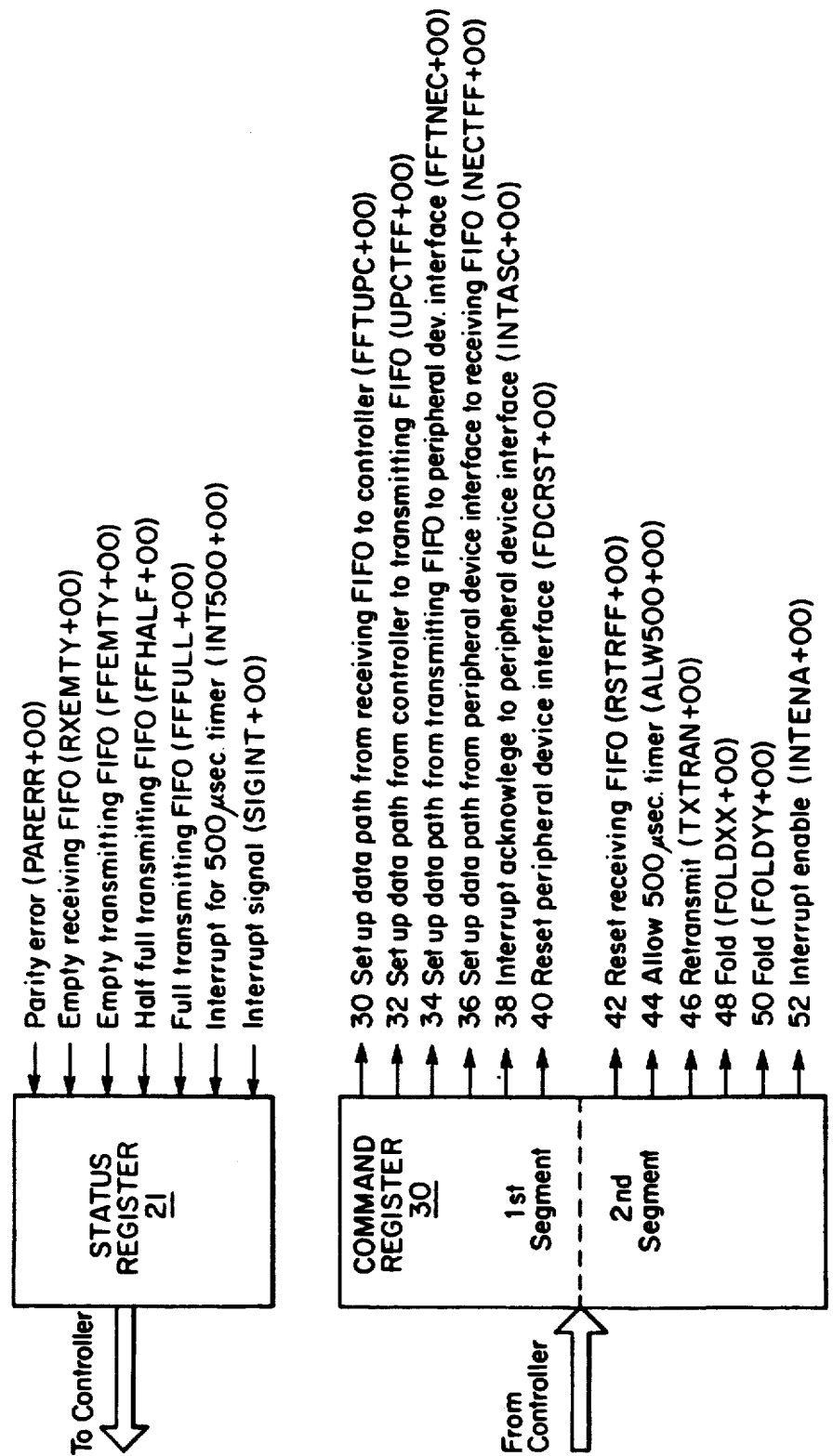
FIG. 2 shows a more detailed view of the command register and status register.

The command register 30 and status register 2 are shown in more detail in FIG. 2. As can be seen in FIG. 2, the command register is divided into two segments. Each segment has several outputs. Included amongst the outputs of the first segment is an output FFTUPC+00 which sets up the data path from the receiving FIFO buffer 14 to the controller 10. UPCTFF+00 is used to set up the data path from the controller 10 to the transmitting FIFO buffer 16; and FFTNEC+00 is provided to set up the data path from the transmitting FIFO buffer 16 to the peripheral device interface 8. The data path from the peripheral device interface 8 to the receiving FIFO buffer, 14 likewise, is set up by NECTFF+00 of the first segment. In addition, the first segment includes an output INTASC+00 that acknowledges interrupts to the peripheral device interface 8, and an output FDCRST+00 that resets the peripheral device interface 8.

In the second segment of the command register 30, RSTRFF+00 resets the receiving FIFO buffer 14. Another output, ALW500+00 allows a 500 microsecond timer 69 to be used as will be discussed in more detail later. Two other outputs FOLDXX+00 and FOLDYY+00 affect the folding of data. Folding concerns altering the character output to comply with the requirements of the attached peripheral device such as converting from upper case to lower case. An additional output TXTRAN+00 sends a retransmit signal to the transmitting FIFO buffer and lastly, INTENA+00 enables interrupts.

The controller keeps tabs on interrupts as well as other status information by checking the status register 21. The status register 21 indicates whether the transmitting FIFO buffer 16 is full (FFFULLX+00), half full (FFHALF+00), or empty (FFEMTY+00). It also notes if the receiving FIFO buffer 14 is empty (RXEMTY+00) and whether a parity error (PARERR+00) has occurred in transmitting data from the transmitting FIFO buffer 16. As such status information is changed, the changes are reflected in the status register 21.

The states of the outputs from the logic circuitry 18 are completely determined by the states of the inputs applied in combination to logic elements in the circuitry 18. Given the functions to be performed by the combinatorial logic circuitry 18, any number of suitable logic element configurations are readily implemented. The inputs are taken from the command register 30, the FIFO status outputs and the peripheral device interface 8.

Although the combinatorial logic approach lacks the flexibility of a microprocessor operating under the control of a set of programmable microinstructions, it allows for a reduction in the amount of circuitry required and provides greater speed in its limited functions. Circuitry such as the random access memory and associated control required by a microprocessor is unnecessary. Because of the limitations of combinatorial logic, the present invention utilizes the programmability and algorithmic capacity of the microprocessor in the controller 10 to perform functions previously handled by the adapter. The adapter, however, still performs those functions which must be handled without delay and includes mechanisms for calling upon the controller microprocessor as required for more detailed yet more casual processing.

Each FIFO buffer 14, 16 has several control inputs as noted in FIG. 1. The read inputs FFREAD−00 and FFREAD−0B accept a read pulse which clocks the data out of the FIFO buffers 14 and 16. The write inputs FFWRTX−0A and FFWTEN−00 are used for a similar purpose. These inputs are write pulses which clock data into the FIFO buffers 14 and 16. The retransmit input TXTRAN−00 is used to reset a pointer in the FIFO buffers 14 and 16. The reset inputs FRESET−00 and RSTRFF−00 allow the FIFOs to be reset. Both the reset and retransmit operations will be discussed in more detail below.

In addition to the control inputs, the FIFOs have three status flags. The full flags FFULLX−00 and RXFULL−00 tell whether or not the buffers are full. The half full flags FFHALF−00 and RXHALF−00 tell whether or not the buffers are at least half full, and lastly, the empty flags FFEMTY−00 and RXEMTY−00 tell whether or not the buffers are empty. These flags are used by the controller 10 and combinatorial logic circuitry 18 in controlling adapter 5 operation. When a FIFO buffer 14 or 16 is reset, all the status flags and pointers are returned to their initial state. The empty status flags are set to indicate that the FIFO buffer 14 or 16 is empty. The other status flags are set to indicate that the FIFO buffer 14 or 16 is not half full and not full respectively. In addition, the pointers pointing to the front and rear of data in the FIFO buffer 14 or 16 are set to the first location in the FIFO buffer 14 or 16.

The control logic controls the FIFOs 14 and 16 so that they operate in two modes: transmitting mode and receiving mode. When in transmitting mode data can be written into or read out of the transmitting FIFO buffer 16, whereas, when in receiving mode data can be written into or read out of the receiving FIFO buffer 14. Hence, during transmitting mode the data path from the transmitting FIFO buffer 16 to the peripheral device interface 8 can be enabled, and during receiving mode the data path from the peripheral device interface 8 to the receiving FIFO buffer 14 can be enabled. In the preferred embodiment, these modes are mutually exclusive. Features of the present invention, however, also encompass the situation wherein the modes are not mutually exclusive.

When the controller 10 has data to transmit to the peripheral device 12, it resets the transmitting FIFO, and sends firmware instructions to the peripheral device interface 8 through directly connected data lines. These firmware instructions set the peripheral device interface 8 in full duplex mode. When in full duplex mode the peripheral device interface 8 can both receive and transmit data. The data transmitted sets registers inside the peripheral device interface to set the interface in full duplex mode. In the preferred embodiment, the peripheral device interface 8 is a ZILOG Z8530 serial communication controller. More information on it can be found in the ZILOG Components Data Book.

The next step is for the controller 10 to place a command in the command register 30 to set up the data path from the controller 10 to the transmitting FIFO buffer 16. This command sets UPCTFF+00 at high so as to set up this data path. The UPCTFF+00 signal enters NAND gate 54 along with MYDTST+00 which is a Direct Memory Access (DMA) strobe signal generated by the controller 10. The output from this NAND gate 54 is FFWRTX−0A which is the write pulse for the transmitting FIFO buffer 16. Since FFWRTX−0A is low active, both UPCTFF+00 and MYDST+00 must be high to write into the transmitting FIFO buffer 16.

The controller 10 then performs a DMA write into the transmitting FIFO 16 using the FFWRTX−0A pulse. Each time the controller 10 sends a piece of data it also sends a MYDST+00 pulse. The pulses and data are sent until the transmitting FIFO buffer 16 is filled or until all the data has been transferred. At that point, the DMA chip in the controller is interrupted by the controller 10.

Figure 4:
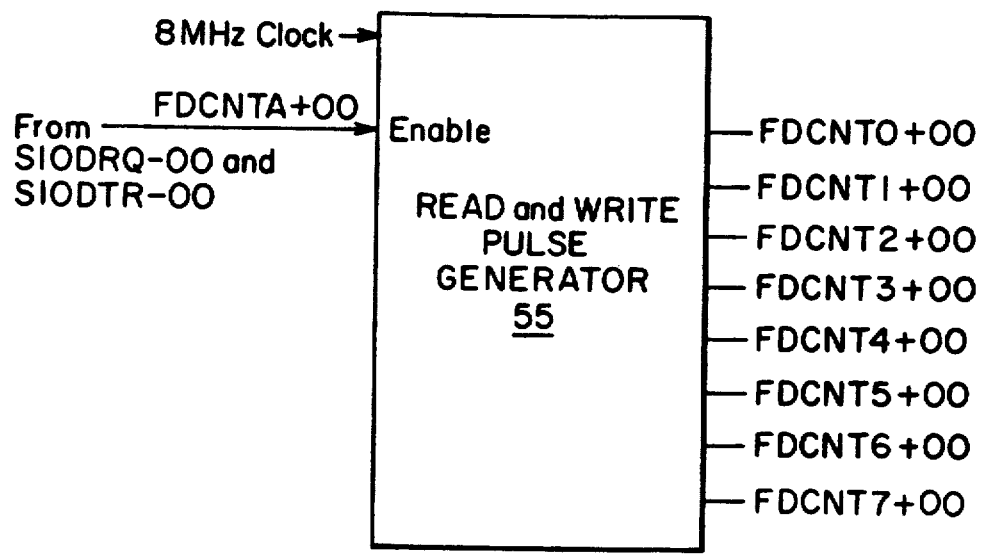
FIG. 4 shows the read and write pulse generator and a timing diagram of its output.
Figure 4:
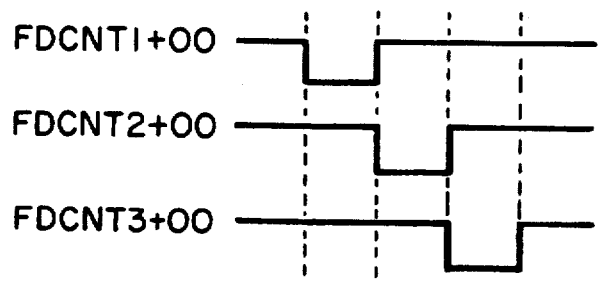

After the DMA chip is interrupted, the controller 10 sends a command to the command register 30 that sets FFTNEC+00 high in order to set up the data path from the transmitting FIFO 16 to the peripheral device interface 8. The controller also sends a GO command to the peripheral device interface 8 to activate the peripheral device interface 8. The peripheral device interface then through its SIODRQ−00 data request signal sets the signal FDCNTA+00. This signal enables a read and write pulse generator 55 (FIG. 4). The read and write pulse generator is a shift register. Each of its outputs is shifted with respect to its predecessor. The two outputs FDCNT1+00 and FDCCNT3+00 are ORed by an OR gate 38 to produce FDC4P6−00. FDC4P6−00 enters a NAND gate 52 along with FFEMTY−1G. FFEMTY−1G is produced by the AND gate 71 of FFEMTY−00, the empty status flag of the transmitting FIFO buffer, and FFREAD−00. The output of the NAND gate 52 is FFREAD−0A. FFREAD−0A is then ORed by OR gate 46 with TXREAD−00, a testing signal, to produce FFREAD−00, the read pulse signal for the transmitting FIFO buffer 16.

The data is then read out of the transmitting FIFO buffer 16 in accordance with FFREAD−00. The peripheral devices interface 8 writes the data into its buffers as it is read out of the transmitting FIFO buffer. It does this by enabling the read and write pulse generator 55 again and using the output FDCNT2+00 to generate a write pulse to write data into the peripheral device interface 8. The timing of the reading and writing is interwoven so that both can occur in parallel. The data is subsequently passed on to the peripheral device 12.

When all the data is read out of the transmitting FIFO buffer 16, the status flag FFEMTY−00 indicates that the transmitting FIFO buffer 16 is empty. When the transmitting FIFO becomes empty, the read pulse FFREAD−00 is no longer active as can be seen by tracking the logic gates involved in generating FFREAD−00. Hence, the reads stop. The peripheral devices interface 8 gets an under-run when it tries to get more data from the transmitting FIFO buffer 16. This under-run tells the peripheral devices interface 8 that there is no more data and it is time to switch to receive mode. When FFEMTY−1G is high, the SIOWTX−00 input to the peripheral devices interface 8 is set high and the peripheral device 8 modes are switched.

When data is received by the intelligent peripheral device 12, the peripheral device 12 in accordance with the HDLC protocol automatically sends status information back to the adapter 5. This status information indicates if there are any problems with the peripheral, or if the most recent data transmission was unsuccessful, or if there were any problems with the most recent data transmission. The absence of a message may indicate problems with the device such as the power being turned off. The controller 10 assumes there is a problem if it does not receive a message indicating otherwise.

Since the peripheral device interface 8 is in duplex mode, the automatic switch from transmitting mode to receiving mode allows the peripheral device interface 8 to receive status information as soon as the peripheral device 12 is ready to forward the information. The status information passed on to the peripheral device interface 8 is converted from serial input to parallel output by the interface 8.

When the first byte of information is relayed to the peripheral device interface 8 by the peripheral device 12, the peripheral device interface 8 generates a SIODTR−00 output which is a data transfer request. The signal enables the read and write pulse generator 55 and the read and write pulse generator 55 that produces the timing signals FDCNT1+00 and FDCNT3+00. These signals are ORed by OR gate 38 to produce a signal FDREAD+00. This signal is ANDed by AND gate 44 with FFEMTY+1G signal to produce the signal FDCRDF+00. FDCRDF+00, in turn, is No Red by NOR gate 32 with FDCRDX+00 to produce the signal SIORDX−00 which is a read pulse into the peripheral device interface 8. Thus, the data is clocked out of the peripheral device interface soon after it enters.

The next step is for this data being clocked out of peripheral device interface to be written into the receiving FIFO buffer 14. This is accomplished by enabling the read and write pulse generator 55 through the SIODTR−00 output of the peripheral device interface 8.

The FDCNT2+00 clock signal is used. FDCNT2+00 enters a NAND gate 36 along with FFEMTY+1G to produce FFWTTX−0A. This signal is ANDed with RXWRIT−00 by AND gate 48 to produce the write pulse FFWTEN−00 for the receiving FIFO buffer 14. It is synchronized with the reads so that as data is read out of the peripheral devices interface 8, it is written into the receiving FIFO buffer 14.

When all the data is written into the receiving FIFO buffer 14, the peripheral device interface generates an interrupt SIGINT+00 to the controller 10 that tells the controller that there is status information for 14. The interrupt is reflected in the status register. Thus, the next time the controller 10 polls the adapter 5, the controller will know that it has to service the adapter 5.

When the controller sees the interrupt, it issues a command to the command register 30 that sets FFTUPC+00 high. This sets up the data path from the receiving FIFO buffer 14 to the controller 10. The controller then uses a data strobe or DMA transfer to read the data from the receiving FIFO buffer. If a firmware request is desired, the controller 10 uses the WRPDAT−00 signal, and if DMA request is desired, the DPACO−00 signal is used. These two signals are NANDed by NAND gate 42. The NAND gate output is BUSDAT+00 which is NANDed with FFTUPC+00 to produce FFREAD−0B. FFREAD−0B is the read pulse for the receiving FIFO buffer. FFREAD−0B is used to read the data out of the receiving FIFO buffer 14. When the receiving FIFO buffer is empty, RXEMTY−00 will so indicate. This is reflected in the status register 21 and the controller knows to stop reading.

If the status information received by the controller 10 indicates that there is no problem and that the data transmission was successful, then the above described sequence is repeated. Suppose, however, that the status information indicates that there is a problem and that the data transmission was unsuccessful. In that event, the controller attempts a retransmission of the data in the transmitting FIFO buffer 16. The controller must wait 500 microseconds for the peripheral device 12 to settle. Thus, when a retransmit is necessary, a command is placed in the command register 30 which sets ALW500+00 so as to enable the 500 microsecond timer 69. At the end of 500 microseconds, an interrupt INT500+00 is generated which prompts the controller to act on the retransmit.

The controller 10 acts by issuing a retransmit command to the command register 30. TXTRAN+00 will be set high. The pointer pointing to the front of the data is reset to the initial location in the transmitting FIFO buffer 16. After this is done, the data presently residing in the transmitting FIFO is once again sent to the peripheral 12. There is no reset command so the rear pointer is not altered. The controller 10 tries to retransmit a maximum of ten consecutive times before it stops trying. If retransmission is successful, it no longer attempts to retransmit.

The control logic is designed to allow the FIFOs 14, 16 to easily handle large data transfers. When a block of data larger than the transmitting FIFO buffer 16 is sought to be transferred, the controller 10 sends enough data to entirely fill the transmitting FIFO buffer 16 in a DMA operation. The contents of the transmitting FIFO buffer 16 are then read out until the buffer is at least half empty. At that point, the half-full status flag indicates that the buffer is no longer half-full and the controller notes that flag when it next polls the adapter. The controller then loads into the buffer 16 a set of data equal to half the size of the buffer 16 in a DMA operation. This new data is appended to the end of the data currently residing in the buffer 16. Meanwhile, the data can still be read out of the buffer 16 to provide for more efficient operation.

As mentioned above, the controller 10 is continuously polling the peripheral devices connected to it. It only services the adapter 5 when an interrupt has been generated. In accordance with the HDLC protocol, the peripheral must be polled every 8 milliseconds after a most recent data transfer to it. Polling requires interrupts so that the controller 10 can issue commands which extract status information from the peripheral device 12. Hence, in the preferred embodiment, an interrupt is generated every 8 milliseconds after a most recent interrupt to facilitate polling of the peripheral device 12.

The present invention provides an adapter that is smaller than those relying on microprocessors. It also provides an efficient adapter that can switch from transmitting data to receiving data on the fly. Moreover, it can generate interrupts so that the controller 10 services the adapter only when required. Since, the controller only services the adapter when interrupted, there is no waste of the controller's resources. The use of separate receiving and transmitting FIFOs provides the option of retransmitting without having to reload the FIFO from the controller.

While the invention has been particularly shown and described with reference to a preferred embodiment thereof, it will be understood by those skilled in the art that various changes in form and details may be made therein without departing from the spirit and scope of the invention as described by the appended claims.

We claim:

1. An adapter connected between a peripheral controller and a peripheral device comprising:
   a. a receiving FIFO buffer coupled to said peripheral device and said controller for storing data which is to be transferred to said controller and generating buffer content status signals;
   b. a transmitting FIFO buffer coupled to said peripheral device and said controller for storing data from the controller which is to be transferred to said peripheral device and generating buffer content status signals;
   c. a peripheral device interface means connected between said FIFO buffers and said peripheral device wherein said peripheral device interface means transfers data between said peripheral device and said FIFO buffers; and control logic circuitry coupled to said transmitting FIFO buffer, to said receiving FIFO buffer, and to said peripheral device interface means, wherein the control logic circuitry generates signals for enabling said FIFO buffers to operate in a receiving mode and a transmitting mode in accordance with the buffer content status signals, said circuitry during transmitting mode enabling said transmitting FIFO buffer so that data can be written therein or data read therefrom, and said circuitry comprises a combinatorial logic circuitry which automatically switches modes from transmitting mode to receiving mode when the transmitting FIFO buffer becomes empty.

2. An adapter as recited in claim 1 wherein the data received from the peripheral device by the receiving FIFO buffer is status information concerning the peripheral device.

3. An adapter as recited in claim 1 wherein the peripheral device is a printer.

4. An adapter as recited in claim 1, the control logic circuitry further comprising a command register for storing control commands from the controller and combinatorial logic circuitry wherein the commands establish the logical configuration of the combinatorial logic circuitry.

5. An adapter as recited in claim 1 wherein each FIFO buffer has a status flag that indicates whether or not that FIFO buffer is empty.

6. An adapter as recited in claim 5 wherein the transmitting FIFO buffer transfers its contents to the peripheral device interface when in transmitting mode if the status flag indicates that the transmitting buffer is not empty and that a read request has been made to the transmitting FIFO buffer by the peripheral device interface.

7. An adapter as recited in claim 6 wherein the transmitting FIFO buffer stops emptying its contents to the peripheral device when the status flag indicates that the buffer is empty.

8. An adapter as recited in claim 5 wherein the receiving FIFO buffer begins accepting data from the peripheral device interface when it is in receiving mode, a write request has been made to the receiving FIFO buffer by the peripheral device interface means and the status flag indicates that the transmitting FIFO buffer is empty.

9. An adapter as recited in claim 5 wherein each FIFO buffer also has a status flag that indicates whether or not the FIFO buffer is at least half full.

10. An adapter as recited in claim 9 wherein the status flags and a set of pointers of each FIFO buffer may be reset upon command.

11. An adapter as recited in claim 1 wherein the controller controls when the FIFO buffers are in receiving mode and when they are in transmitting mode.

12. An adapter as recited in claim 11 wherein the controller controls the FIFO buffers by placing commands in the command register to select appropriate inputs into the control logic circuitry.

13. An adapter as recited in claim 1 wherein said data in the transmitting FIFO buffer will be retransmitted to the peripheral device if status information received by the receiving FIFO buffer indicates that the original attempt to transfer the contents of the transmitting FIFO buffer was unsuccessful.

14. An adapter connected between a peripheral controller and a peripheral device comprising:
   a. a receiving FIFO buffer coupled to said peripheral device and said controller for storing data which is to be transferred to said controller and generating buffer content status signals;
   b. a transmitting FIFO buffer coupled to said peripheral device and said controller for storing data from said controller which is to be transferred to said peripheral device and generating buffer content status signal;
   c. a peripheral device interface means connected between said FIFO buffers and said peripheral device wherein said peripheral device interface means transfers data between said peripheral device and said FIFO buffers;

d. control logic circuitry coupled to said transmitting FIFO, to said receiving FIFO; and to said peripheral device interface means and generating signals for enabling said FIFO buffers to operate in a receiving mode or a transmitting mode in accordance with the buffer content status signals; and d. timing means for interrupting the controller to service the adapter.

15. An adapter as recited in claim 14 wherein the timing means generates an interrupt periodically at a constant rate after a most recent interrupt.

16. An adapter as recited in claim 15 wherein the interrupts are generated to poll the peripheral device.

17. An adapter as recited in claim 14 wherein an interrupt is generated when the receiving FIFO buffer contains status information.

18. A method of controlling data transfers through an adapter connected between a peripheral controller and a peripheral device comprising:

a. enabling a transmitting FIFO buffer in said adapter so that data from the peripheral controller may be written to the transmitting FIFO buffer or that data for the peripheral device can be read from said transmitting FIFO buffer and generate buffer content status signals;

b. loading data from the peripheral controller into the transmitting FIFO buffer;

c. unloading and transferring the data in the transmitting FIFO to a peripheral device;

d. automatically disabling the transmitting FIFO buffer so that data may not be read from or written into said transmitting FIFO buffer and enabling a receiving FIFO buffer in the adapter so that data from the peripheral device may be written to the receiving FIFO buffer or that the data for the peripheral controller can be read from said receiving FIFO buffer and generate buffer content status signals;

e. loading feedback status information from the peripheral device into the receiving FIFO buffer;

f. unloading and transferring the feedback status information in the receiving FIFO buffer to the peripheral controller;

g. disabling the receiving FIFO buffer so that data may be written to or read from the receiving FIFO buffer in accordance with the buffer content status signals; and h. repeating the cycle until all data is transferred between the peripheral controller and the peripheral device.

19. A method as recited in claim 18 wherein the unloading from the loading to the FIFO buffers is controlled by combinatorial logic circuitry.

20. A method as recited in claim 19 wherein the controller controls the combinatorial logic circuitry.

21. A method as recited in claim 20 wherein the combinatorial logic circuitry is responsive to status flags in the FIFO buffers which indicate if the FIFO buffers are empty or not.

* * * * *